United States Patent [19]
Franke et al.

[11] Patent Number: 5,503,548
[45] Date of Patent: Apr. 2, 1996

[54] METHOD FOR REDUCING POLLUTANT GAS EMISSIONS IN COMBUSTION AND BURNER THEREFOR

[75] Inventors: Heinz Franke; Ralf Hamberger, both of Krefeld; Michael Pfeuster, Ratingen, all of Germany

[73] Assignee: Messer Griesheim GmbH, Frankfurt, Germany

[21] Appl. No.: 336,530

[22] Filed: Nov. 9, 1994

[30] Foreign Application Priority Data

Jan. 13, 1994 [DE] Germany ............... 44 00 831.7

[51] Int. Cl.⁶ ............................................. F23M 3/04
[52] U.S. Cl. ................ 431/10; 431/11; 431/160; 239/129; 239/132.3
[58] Field of Search ............... 431/11, 10, 160; 239/129, 132.3

[56] References Cited

U.S. PATENT DOCUMENTS

| | | | |
|---|---|---|---|
| 4,067,682 | 1/1978 | Lado | 431/160 |
| 4,541,796 | 9/1985 | Anderson | 431/10 |
| 4,797,087 | 1/1989 | Gitman | 431/160 |
| 5,104,310 | 4/1992 | Saltin | 431/160 |

*Primary Examiner*—Carroll B. Dority
*Attorney, Agent, or Firm*—Connolly and Hutz

[57] ABSTRACT

The invention relates to a process and apparatus for reducing pollutant gas emissions in the combustion of fuel, which utilize oxygen or oxygen-enriched air while avoiding the resulting disadvantages of high flame temperature and low gas momentum resulting in high $NO_x$ emissions. The invention provides a process of burning fuel, which simultaneously injects two jets of heated oxidant gas such as recirculated furnace gases and mixing such recirculated furnace gases with the oxidant into the furnace.

17 Claims, 5 Drawing Sheets

METHOD FOR REDUCING POLLUTANT GAS EMISSIONS IN COMBUSTION AND BURNER THEREFOR

BACKGROUND OF THE INVENTION

Combustion processes which employ oxygen as oxidizing agent were always used in the past when increase in the efficiency of a furnace unit, savings of primary energy or reducing the volume of the combustion exhaust gases were required. In addition to these main advantages of use of oxygen, the ignition behavior and flame stability were improved and higher process temperatures can be achieved.

The combustion processes were optimized in the past principally with respect to the degree of combustion, in that the resulting CO gases and CH compounds were completely burned.

The adiabatic flame temperatures which are higher by 800° to 1000° C. when technical-grade oxygen is used as compared to a fuel/air combustion lead to more intensive nitrogen oxide (NOx) formation.

The nitrogen oxides arising as by-products in the combustion are considered to be a cause of acid rain and increased ozone formation (harming of forests and people).

Although the dependencies and qualitative shares of the NOx formation mechanisms have not yet been completely clarified, it is currently considered to be confirmed that the flame temperature >1300° C. the residence time of the oxygen at high temperatures and the oxygen partial pressure are the chief influencing factors on the thermal NOx formation.

At the same time, NOx is formed on the basis of the nitrogen organically bound in the fuel. In addition, promt-NO- formation occurs, by free oxygen reacting during the course of the combustion.

The principal requirements which are made of low-pollutant combustion, such as stable ignition behavior, making possible large control ranges without flame instabilities and ensuring complete combustion, have decisively influenced the combustion concepts and aspects of the necessary burner structures.

The previously known low-pollutant combustion methods and the associated combustion devices are NOx-reducing measures for near-stoichiometric combustion, avoidance of flame temperature peaks by recirculation of combustion exhaust gases to the combustion zone and multi-stage combustion by dividing the amount of oxygen required into at least two part-streams.

Scientific studies have been able to confirm in the last decade that the flame temperature peaks are the main cause of thermal NOx formation. From this resulted the requirement of creating effective flame cooling. The flames can be cooled by recirculation of combustion exhaust gases and adding them to the combustion zone or by means of internals in the combustion zone. The internals are exposed to intense heat effects so that they are subjected to high wear.

In a known combustion concept for low-pollutant gas combustion with oxygen, a high-impulse flow of the main oxygen stream was provided for recirculation of the combustion exhaust gases.

To generate the high-impulse flow of the main oxygen stream, Laval nozzles have been proposed (U.S. Pat. No. 5,104,310) in which the pressure energy is converted into velocity.

Disadvantages which result are the high manufacturing costs of these burners and the unsatisfactory control range of the burner. Low-pollutant gas emissions are principally achieved for the design conditions, since the Laval nozzles only operate optimally in a narrow range.

In the known combustion methods for low-pollutant gas combustion, at least 5 to 10% of the oxygen required for stoichiometric combustion is required for flame stabilization. As a result of these large amounts of oxygen, NOx is additionally formed in the region of the flame root.

The use of burner bricks for flame stability with simultaneous reduction of the primary oxygen amounts to 1 to 5% leads to additional costs, since the burner bricks are composed of high-grade materials and are exposed to accelerated wear because of the high thermal stresses.

The methods previously known for low-pollutant gas combustion only partially fulfill the requirements made with respect to decreased NOx pollutant gas emissions with simultaneous economic utilization of the fuel (no unburnt fuel). They thus operate economically only in a restricted range.

SUMMARY OF INVENTION

The object underlying the invention is to create a method and an apparatus which make possible oxidation of fuel by a predominantly oxygen-containing oxidizing agent under economic conditions with simultaneously lower pollutant formation (NOx) over a large control range.

Achieving the greatest possible additional advantage at high-impulse flow of the main oxygen stream which is necessary for the recirculation of the combustion exhaust gases is achieved according to the invention by preheating the oxygen-containing oxidizing agent having a minimum oxygen content of 90% to a temperature greater than 100° C. by the combustion exhaust gases or by an external device. As a result, a combustion-power-related high-impulse flow of at least 23.6 N/MW (newtons per megawatt) can be generated. The high-impulse flow of the main oxygen stream required for mixing-in the combustion exhaust gases is virtually compensated for in the case of output changes of the burner (decrease of the rate of the main oxygen stream) by increasing the preheating temperature in the control range of 1:8.

As a result, the high-impulse flow of the main oxygen stream is ensured even in the event of load changes of the burner, so that, independently of the loading range, the NOx and CO emissions remain constantly low.

The structural design of the nozzles for the main oxygen stream which have a combustion-power-related outlet cross-sectional area of at least 350 mm$^2$/MW ensures that the flow conditions match the changing outputs of the burner and thus make possible decisively the economic utilization of the fuel under environmentally satisfactory conditions, a stable flame signal being given over the entire control range to the burner safety monitor.

As a result of the arrangement according to the invention of the main oxygen nozzles, expedient preconditions have been created so that the external diameter of the burner can be dimensioned to be small.

As a result of the arrangement and dimensioning according to the invention of the feed channel for the primary oxygen stream in the water-cooled feed channel for the fuel and the given primary oxygen temperature of ≦30° C., a stable pilot flame is guaranteed with low rates of primary oxygen which delivers an adequate UV signal to the burner monitor. As a result, temperature peaks in the flame root due to the low primary oxygen stream are avoided in the case of extensively substoichiometric combustion. The use of burner bricks can be dispensed with.

The design according to the invention of the water-cooled feed channel for fuel and the combustion-power-related fuel impulse stream, in combination with the temperature of the primary oxygen stream of ≦30° C. and the low proportion of the primary oxygen stream of <1% of the stoichiometrically required oxygen rate avoid temperature peaks in the flame root and thus pollutant emissions. The flame is held stably at the outlet and burns with a low flame temperature.

The method according to the invention and the burners according to the invention reduce the pollutant gas emissions and are suitable particularly owing to stable and complete combustion for heating industrial furnaces. The more severe limit values for nitrogen oxides and carbon monoxide are undershot by far so that economical operation of the entire furnace unit under environmentally protective conditions is achieved.

The novel method can be carried out with gaseous and/or liquid atomized fuel.

The invention is to be described in more detail below on the basis of exemplary embodiments. Exemplary embodiments of the burners according to the invention are diagrammatically depicted below in the drawings.

A BRIEF DESCRIPTION OF THE DRAWINGS

DETAILED DESCRIPTION

Figure 1:
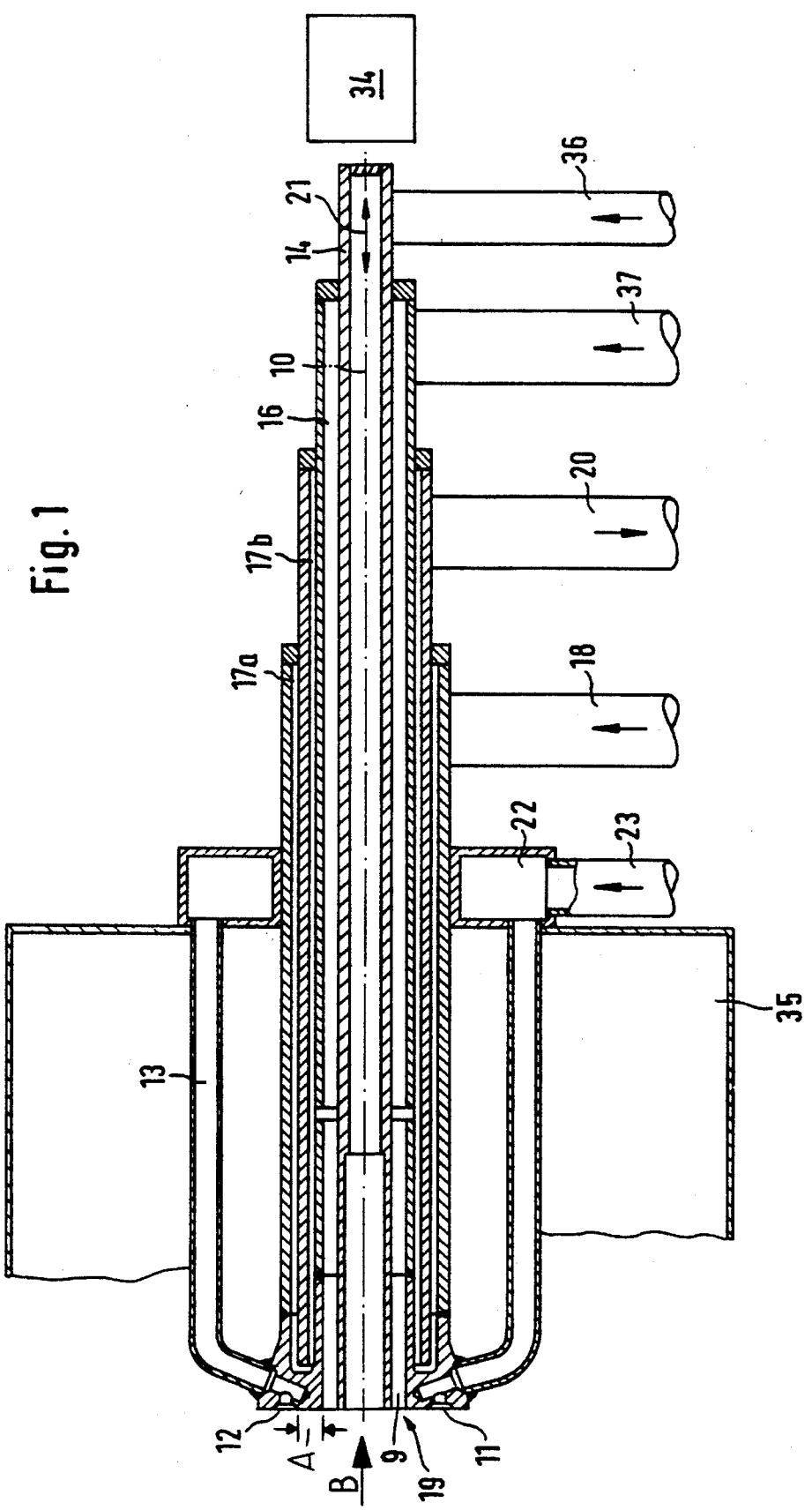
FIG. 1 shows a section through a burner for carrying out the method.
Figure 3:
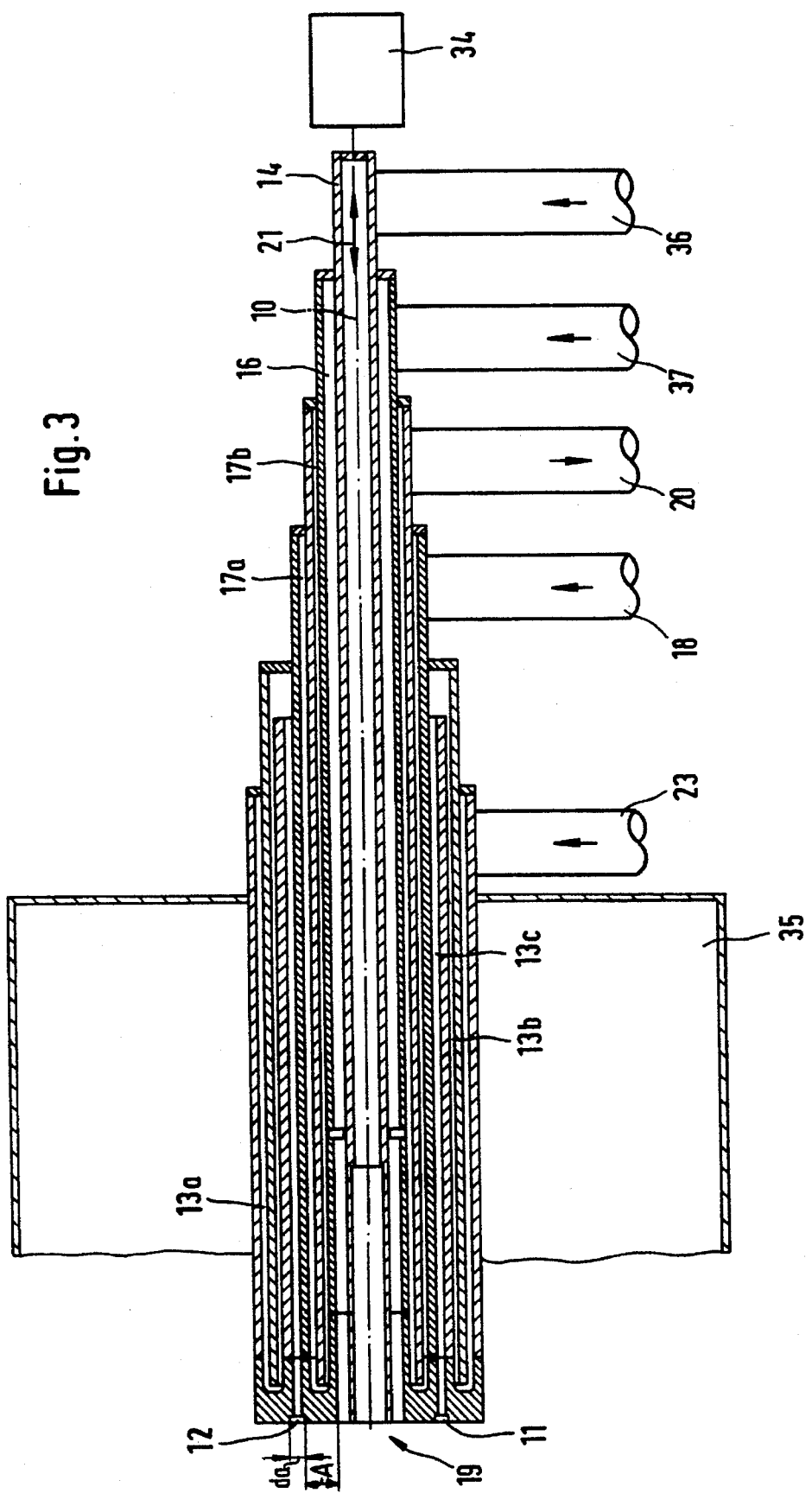
FIG. 3 shows a section through a burner for carrying out the method having, in concentrically arranged feed channels, a main oxygen stream which is indirectly preheated via the radiant heat of the furnace.
Figure 4:
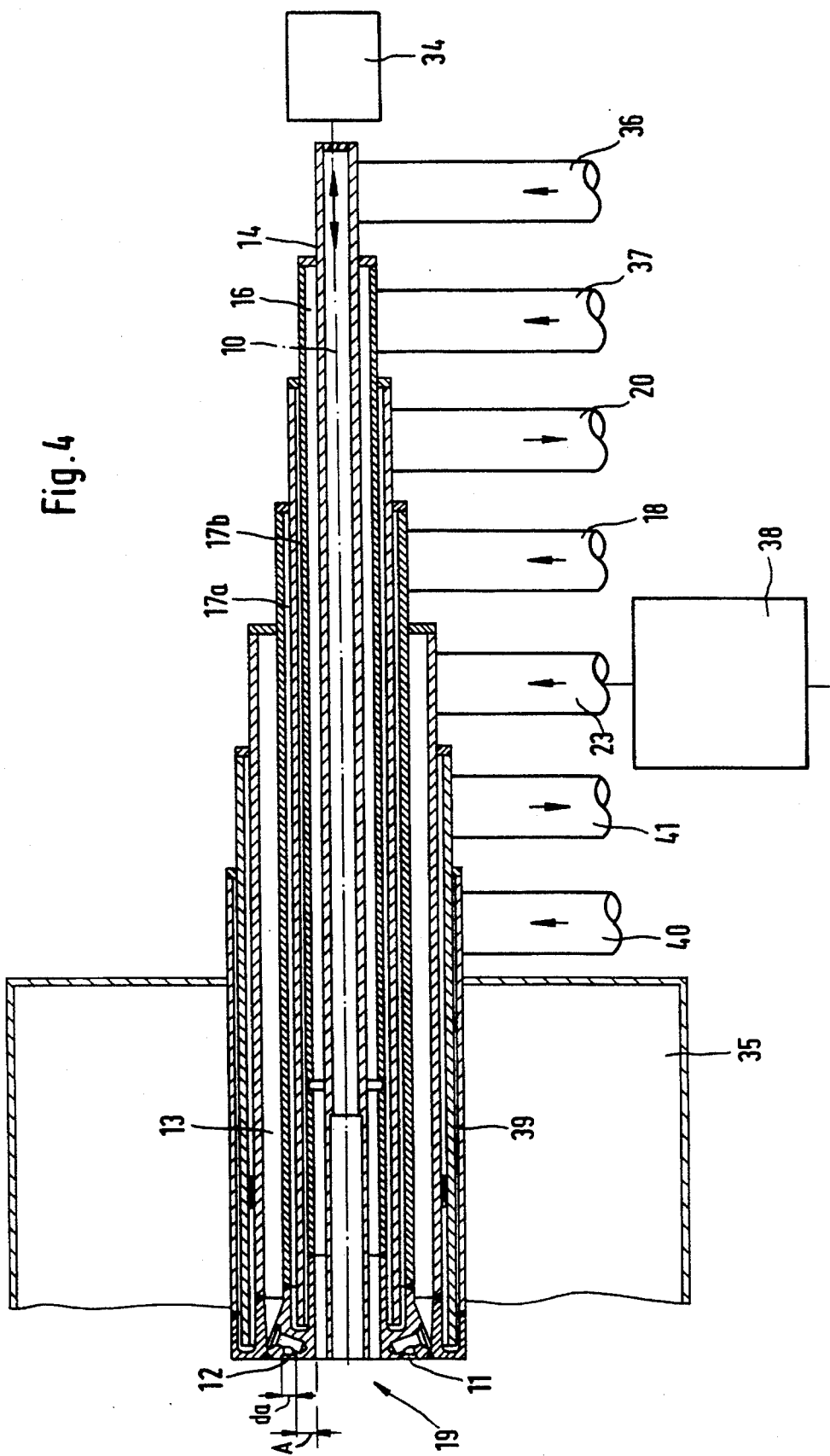
FIG. 4 shows a section through a water-cooled burner having external oxygen ($O_2$) preheating for the main oxygen stream.

In the burners depicted in FIGS. 1, 3 and 4, the same parts have been given the same reference numbers. The burner depicted in FIG. 1 is composed of a central feed channel 14 for the primary oxygen stream which is arranged on the central axis 10 of the water-cooled feed channel 16 for fuel stream and is thus concentrically surrounded by the feed channel 16. The feed channel 14, in accordance with the arrows 21, is arranged to be able to slide in the feed channel 16 for the fuel stream and preferably ends on a plane with the outlet of the feed channel 16 for the fuel stream. The feed channel 16 for the fuel stream is concentrically surrounded by feed channels 17a, 17b for a coolant medium, preferably water.

The coolant medium flows via line 18 into the feed channel 17a, is guided up to the immediate vicinity of the outlet 19 of the fuel stream, deflected here and flows out of the feed channel 17b via the line 20. Outside the water-cooled feed channel 16 for the fuel stream are arranged feed channels 13 for main oxygen. The feed channels 13 are connected via a ring channel 22 and line 23 to a source of supply of oxygen not shown in more detail. As FIG. 1 and FIG. 2 show, the feed channels 13 for the main oxygen stream are arranged at a lateral distance to the feed channels 17a, 17b for coolant medium.

Figure 2:
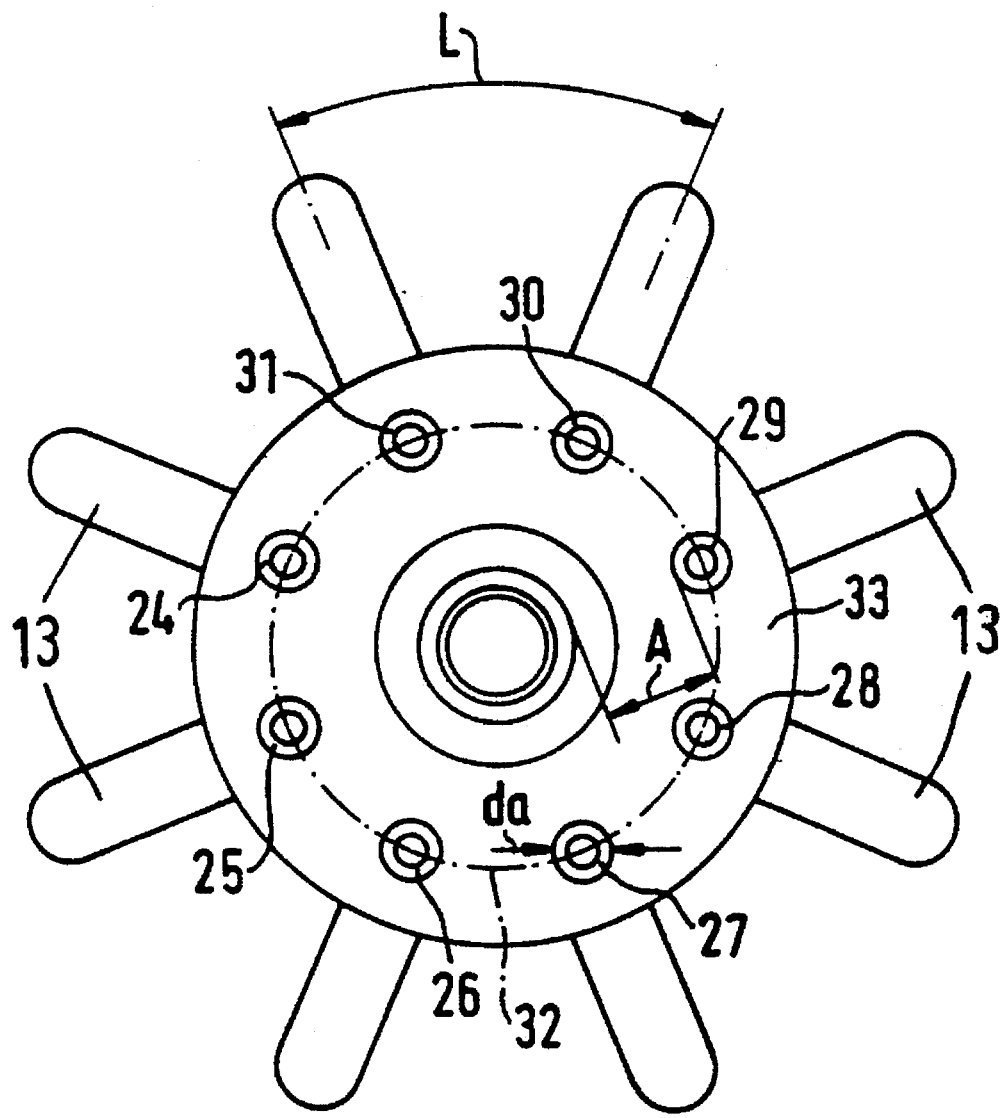
FIG. 2 shows the view B of the fuel outlet of the burner according to FIG. 1.

The eight feed channels 13 depicted in FIGS. 1 and 2 are composed of separate tubes and, starting from the ring channel 22, run essentially in parallel to the central axis 10 up to the vicinity of the outlet 19 of the fuel stream, bend off here and respectively open into the eight main oxygen nozzles 24 to 31 arranged in a nozzle body 33. At least two, preferably at least four, main oxygen nozzles are advantageously provided on a circle 32. The outlet channels 11, 12 (FIG. 1) of the main oxygen nozzles run in parallel to the outlet channel 9 of the water-cooled feed channel 16 for the fuel stream and have a minimum axial spacing L from each other which is a multiple of, preferably at least 3 times, the nozzle diameter $d_a$ of the main oxygen nozzles. The nozzles 24 to 31 for the main oxygen stream have a combustion-power-related outlet cross-sectional area F of at least 350 mm$^2$/MW, the preferably at least four outlet channels 11, 12 for the main oxygen stream arranged in the circle 32 about the water-cooled feed channel 16 for the fuel stream having a diameter $d_a$ which is greater than the value defined by the formula $$d_a = 1.13 \, (F/\eta)^{1/2},$$

$d_a$ being measured in mm, F in mm$^2$/MW and $\eta$ being the number of outlet channels of the main oxygen nozzles. The water-cooled feed channel 16, at the outlet 19 of the fuel, has a spacing A from the outlet channels 11, 12 of the main oxygen nozzles 24 to 31 which has a value defined by the inequality $$A < 3.9 \, d_a,$$

$d_a$ being the diameter of the outlet channels 11, 12 of the main oxygen nozzles.

The burner is arranged in a closed combustion chamber 35. A primary oxygen stream flows via line 36 into the feed channel 14 and a fuel stream flows into the water-cooled feed channel 16 via line 37. The outlet channel 9 for the fuel stream is designed here according to an exemplary embodiment not depicted in more detail as a nozzle tapering toward the outlet 19 and constricting the fuel stream. The velocity of the primary oxygen stream is between 1.5 and 10 m/s and of the gaseous fuel stream is between 15 and 75 m/s. The proportion of the primary oxygen is at least 0.4% of the stoichiometrically required rate of the oxidation gas. After the ignition, fuel partially burns with the primary oxygen. A stable pilot flame forms which emits a sufficient signal for a sensor which is preferably designed as a UV light receiver 34 which is connected to an evaluation unit for monitoring the burner. The primary oxygen stream flows at a temperature <30° C. into the feed channel 14. The main oxygen stream is preheated to a temperature of at least 100° C. before the oxidation with the fuel. The preheating is performed via the radiant heat of the combustion exhaust gases in the case of burners according to the exemplary embodiments in FIGS. 1 and 3. For this purpose, the feed channels 13 for the main oxygen are on the outside and are depicted as in the case of the burner according to FIG. 1 arranged with a lateral spacing from the feed channels 17a, 17b for coolant medium so that they are impinged by the radiant heat, freely exposed on all sides. In the burner according to FIG. 3, the main oxygen flows via line 23 into the outside feed channel 13a which is impinged by the radiant heat of the combustion exhaust gases. The main oxygen stream is deflected via feed channels 13b, 13c running parallel to the central axis 10 before it exits from the main oxygen nozzles 24 to 31.

In the burner depicted in FIG. 4, a preheating device 38 is connected via line 23 for the main oxygen, by means of which preheating device the main oxygen is preheated to at least 100° C. In departure from the burners according to FIGS. 1 and 3, the feed channel 13 for the main oxygen is surrounded by a feed channel 39 for a coolant medium which flows via line 40 into the feed channel 39, is deflected in the region of the outlet 19 of the fuel and is passed out of the burner via line 41. This burner can be operated at high furnace temperatures.

The main oxygen stream exiting from the main oxygen nozzles 24 to 31 of FIGS. 1 to 4 of the burners flows with a combustion-power-related impulse stream at stoichiometric combustion of at least 23.6 N/MW and a velocity of greater than 310 m/s. It effects an intensive recirculation of the combustion exhaust gases which mix with the main oxygen stream and the combustion gas and primary oxygen stream. The combustion-power-related fuel impulse stream of at least 0.5 N/MW at the outlet 19 is in this case, depending on the type of fuel, between 2% and 30%, preferably between 2% and 18% of the impulse stream of the oxidation gas. A low-pollutant, in particular low-NOx, oxidation takes place owing to the decline of temperature peaks and a uniform temperature field in the flame. Furthermore, as a result of the design according to the invention of the water-cooled feed channel 16 for fuel and the combustion-power-related fuel impulse stream in combination with the primary oxygen temperature ≦30° C. and the low proportion of the primary oxygen of <1% of the stoichiometrically required oxygen rate, temperature peaks in the flame root are avoided. The oxygen content of the oxidation gas is advantageously at least 90%.

The burners for carrying out the method which are described in the exemplary embodiments in connection with FIGS. 1 to 4 have as a feature the fact that the nitrogen oxide emissions are drastically reduced. In the diagram according to FIG. 5, the NOx content of dry combustion exhaust gas is illustrated in relation to the furnace temperature.

The area A shown hatched illustrates the NOx emissions in the case of conventional natural gas/oxygen burners which operate without measures for NOx reduction. In the entire temperature range, the NOx emissions are far above the Air Pollution Control Regulations limit value of 500 mg/m³.

Figure 5:
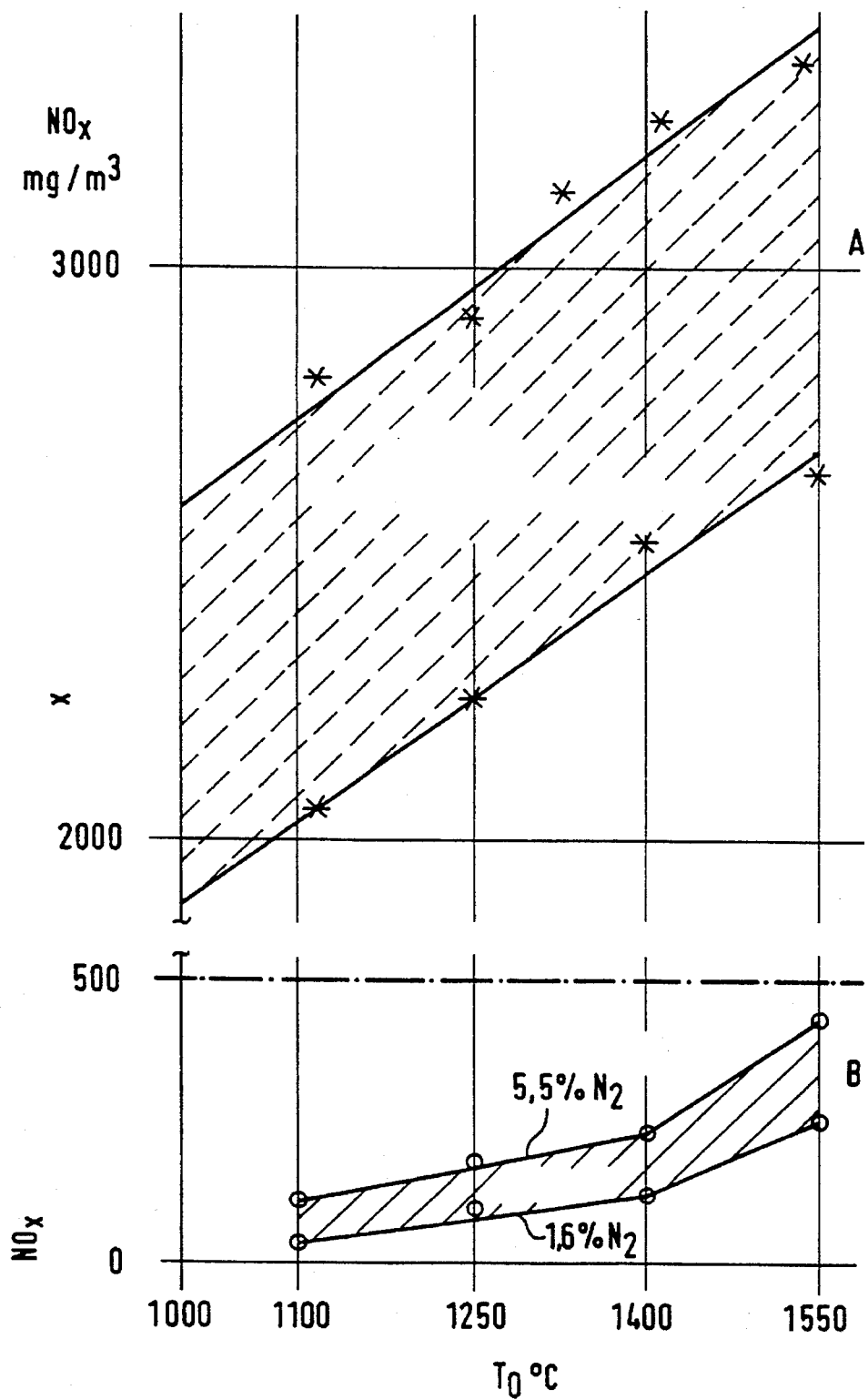
FIG. 5 shows a diagram to illustrate the NOx formation occurring in relation to the natural gas quality and the process temperature.

The results of the NOx emissions of the method according to the invention are shown in the hatched area B in relation to the natural gas quality and the furnace temperature. As FIG. 5 shows, in the burners operating by the method according to the invention significantly more favorable conditions result, significant undershooting of the Air Pollution Control Regulations limit value being achieved.

Still further marked are the rates of decrease with use of the method according to the invention for the pollutant gases NOx and CO when the emissions are related to the enthalpy. The Air Pollution Control Regulations limit values are for NOx approximately 450 mg/kWh and for CO approximately 90 mg/kWh. The actual values of the lower curve of area B are, for NOx, between 3.5 and 28 mg/kWh and, for CO, between 6.0 and 18 mg/kWh. It is concluded therefrom that very low pollutant gas emissions result with simultaneously economic energy utilization with the method according to the invention.

We claim:

1. A method for reducing pollutant gas emissions in the combustion of fuel in a combustion chamber, in which method the fuel is oxidized with a predominantly oxygen-containing oxidizing agent in the presence of recirculated combustion exhaust gases, which comprises:

(a) dividing the oxidizing agent into a main stream and a primary stream;

(b) preheating the main stream in a burner to a temperature of at least 100° C. before it participates in the oxidation of the fuel and generating a combustion-power-related impulse stream of the main stream at stoichiometric combustion of at least 23.6 N/MW at the burner;

(c) feeding the fuel to the combustion as a fuel stream in a preferably water-cooled feed channel and generating a combustion-power-related fuel impulse stream at the outlet, depending on the type of fuel, between 2% and 30% of the main stream impulse stream at the burner; and (d) feeding the primary stream at a temperature ≦30° C., the proportion being <1% of the stoichiometrically required oxygen rate and the primary stream partially burning with the exiting fuel and then being mixed with the main stream and recirculated combustion exhaust gases.

2. The method as claimed in claim 1, wherein the main stream has a spacing A from the fuel stream, which spacing is given from the outer rim of the fuel stream to the outer rim of the main stream at the outlet and has the value defined by the inequality $$A < 3.9 \, d_a,$$

$d_a$ being the diameter of the main stream at the outlet.

3. The method as claimed in claim 1, wherein the main stream has a combustion-power-related outlet cross-sectional area of at least 350 mm²/MW.

4. The method as claimed in claim 1, wherein the oxygen content in the oxidizing agent is at least 90%.

5. The method as claimed in claim 1, wherein the main stream is preheated by means of the radiant energy of the combustion exhaust gases.

6. The method as claimed in claim 1, wherein the velocity of the main stream is greater than 310 m/s.

7. The method as claimed in claim 1, wherein the main stream is fed to the combustion from at least 2 nozzles arranged in a circle about the water-cooled feed channel for fuel.

8. The method as claimed in claim 1, wherein the velocity of the fuel stream is between 15 and 75 m/s.

9. The method as claimed in claim 1, wherein the velocity of the primary stream is between 1.5 and 10 m/s.

10. The method as claimed in claim 1, wherein the main stream has a spacing A from the fuel stream, which spacing is given from the outer rim of the fuel stream to the outer rim of the main stream at the outlet and has the value defined by the inequality $$A < 3.9 \, d_a,$$

$d_a$ being the diameter of the main stream at the outlet, the main stream having a combustion-power-related outlet cross-sectional area of at least 350 mm²/MW; the oxygen content in the oxidizing agent being at least 90%; the velocity of the main oxygen stream being greater than 310 m/s; the velocity of the fuel stream being between 15 and 75 m/s; and the velocity of the primary stream being between 1.5 and 10 m/s.

11. A burner for reducing pollutant gas emissions in the combustion of fuel wherein the fuel is oxidized by a predominantly oxygen-containing oxidizing agent in the presence of recirculated combustion exhaust gases in a combustion chamber having nozzles for a main oxygen-containing stream to recirculate the combustion exhaust gases and for a primary oxygen-containing stream, which comprises:

(a) means for dividing the predominantly oxygen containing agent into a main stream and a primary stream;

(b) a device for preheating the main stream before it participates in the oxidation of the fuel and for generating a combustion-power-related impulse stream of the main stream;

(c) means including a cooled fuel feed channel for feeding the fuel to the combustion as a fuel stream:

(d) the device for preheating the main stream including nozzles for the main stream generating a combustion-power-related impulse stream of at least 23.6 N/MW;

(e) the nozzles for the main stream having a combustion-power-related outlet cross-sectional area F of at least 350 mm²/MW, at least 2 nozzles for the main stream being arranged in a circle about the feed channel for fuel and having a diameter $d_a$ which is greater than the value defined by the formula $$d_a = 1.13 \, (F/n)^{1/2},$$

$d_a$ being measured in mm, F in mm²/MW and n being the number of nozzles;

(f) the device for preheating the main stream heating the main stream to at least 100° C.;

(g) the feed channel for the fuel generating at the outlet a combustion-power-related impulse stream of at least 0.5 N/MW; and (h) feed channel for the primary stream being arranged on the central axis of the feed channel for fuel and having at the outlet a cross-sectional area which generates at an oxidation ratio of <0.01 percent, of the stoichiometrically required oxygen rate a velocity of at least 1.5 m/s, the primary stream partially burning at the outlet with the exiting fuel and then mixing with the main stream and recirculated combustion exhaust gas.

12. The burner as claimed in claim 11, wherein the fuel feed channel is water-cooled and has at the water-cooled outlet a spacing A from the nozzles for the main stream, A being measured from the outer diameter of the feed channel for fuel to the outer diameter of the nozzles at the outlet and having a value which is less than 3.9 $d_a$.

13. The burner as claimed in claim 11, wherein the minimum circumferential spacing L of adjacent nozzles for the main stream is a multiple of the nozzle diameter $d_a$.

14. The burner as claimed in claim 11, wherein the outlet channels of the nozzles for the main stream are arranged in parallel to the outlet channel of the feed channel for fuel.

15. The burner as claimed in claim 11, wherein the feed channel for the primary stream is designed to be able to slide in the feed channel for fuel, and the outlet of the feed channel for the primary stream ends with the outlet of the feed channel for fuel.

16. The burner as claimed in claim 11, wherein the feed channel for the primary stream is joined to a sensor for determining flame conditions, and the sensor being connected to an evaluation unit for flame monitoring.

17. The burner as claimed in claim 12, wherein the minimum circumferential spacing L of adjacent nozzles for the main stream is a multiple of at least 3 times the nozzle diameter $d_a$; the outlet channels of the nozzles for the main stream being arranged in parallel to the outlet channel of the water-cooled feed channel for fuel; the feed channel for the primary stream being designed to be able to slide in the water-cooled feed channel for fuel and the outlet of the feed channel for the primary stream ends with the outlet of the water-cooled feed channel for fuel; and the feed channel for the primary stream is joined to a sensor in the form of a UV light receiver for determining flame conditions, and the sensor being connected to an evaluation unit for flame monitoring.

* * * * *